United States Patent Office 3,551,370
Patented Dec. 29, 1970

3,551,370
METHOD OF AGGLOMERATING LATICES
William O. Dalton, Ludlow, Mass., assignor to Monsanto Company, St. Louis, Mo., a corporation of Delaware
No Drawing. Filed Jan. 2, 1968, Ser. No. 694,870
Int. Cl. C08f 47/02
U.S. Cl. 260—23.7          11 Claims

ABSTRACT OF THE DISCLOSURE

There is disclosed a process for agglomerating latices of a polymer to provide larger particles. An acid anhydried is admixed with an aqueous latex of a polymer which contains an inorganic electrolyte and an organic acid salt emulsifying agent for the latex and the admixture is allowed to stand for a period sufficient to hydrolyze the acid anhydride and produce agglomeration of the polymer particles. Thereafter, the latex is stabilized with emulsifying agent.

BACKGROUND OF THE INVENTION

Latices of various polymers are useful for a wide range of applications. In recent years, rubber latices have been widely employed for the manufacture of rubber-reinforced plastics such as impact styrene and ABS materials. Although rubbers may be mechanically admixed with such polymers, greatly improved results are obtained by providing chemical adhesion between the rubber phase and the matrix by grafting at least a portion of the matrix polymer onto the rubber particles. It has also been noted that the impact strength of the rubber-modified cimpositions at times is dependent upon the size of the rubber particles dispersed therein within certain limits so that there has been interest in increasing the size of the rubber particles obtained by conventional latex polymerization processes.

Various techniques have been suggested for increasing the size of the rubber particles in the latex including creaming techniques, seeding during polymerization, and agglomeration by freeze-thaw, acidulation and salting techniques. Many of the procedures suggested have not offered large enough particles within reasonably controlled spreads of particle size, or have involved critical control of the various aspects of the process, or have been relatively costly. In some instances the chemical nature of the agglomerated rubber particle has varied from that of the particles prior to agglomeration.

In Applicant's copending application entitled Method for Agglomerating Latices, filed Oct. 23, 1967, and bearing Ser. No. 677,078, there is disclosed an improved process for agglomerating latices based upon the use of acid anhydrides and latices containing organic acid salts as the emulsifying agents. The acid anhydride destroys the emulsifying agent because of its higher ionization constant and the unstabilized latex permits the particles to collide and agglomerate into large particles which are subsequently stabilized.

This technique has proven highly effective in obtaining latices with particle sizes varying with the polymer and ranging up to about 1 micron. However, there has remained a desire to obtain even larger particles with some latices and a desire to reduce the amount of the relatively expensive acid anhydride and time required to obtain particles of a given size.

It is an object of the present invention to provide a novel process for agglomerating relatively small particles in an aqeous latex into larger particles with relatively good control over the range of particles produced and which affords improved economy and cycle times.

It is also an object to provide such a process which may be used with various latices of polymers having a composition providing a surface permitting fusion or bonding of colliding particles.

A further object is to provide such a process which is particularly advantageous for producing large rubber particles useful as a reinforcing agent in various polymeric matrices.

SUMMARY OF THE INVENTION

It has now been found that the foregoing and related objects can be readily obtained in a process wherein the aqueous latex of a suitable polymer contains an inorganic electrolyte prior to admixture with the water-soluble acid anhydride. The latex contains as an emulsifying agent the salt of an organic acid with an ionization constant lower than that of the acid of the anhydride. The admixture is allowed to stand with minimal agitation for a period sufficient to hydrolyze the acid anhydride and produce agglomeration of the polymeric particles in the latex, and thereafter the latex is stabilized with emulsifying agent prior to subjecting it to any substantial agitation.

As will be fully pointed out hereinafter, the present process may be used with various latices of polymers which have surfaces which are relatively soft or swellable by solvent and which utilize as emulsifying agents salts of weak organic acids. It appears that the present invention results from the slow hydrolysis of the acid anhydride to form the free acid which then dissociates, and the concurrent formation of the weak organic acid as a result of hydrolysis of the emulsifying agent. Since the acid of the emulsifying agent is weaker, i.e., has an ionization constant lower than that of the acid of the anhydride, the emulsifying agent is destroyed with resultant loss in protection for, or in stabilizing effect, upon the latex particles. Since the emulsifying agent is thus being removed from effective action, the polymer particles now collide as a result of Brownian movement and tend to adhere to each other and form larger particles. By avoiding excessive collisions and growth, coagulation can be avoided and particles of the desired size can be obtained.

The effect of the electrolyte in the process is not fully understood. However, various techniques involving the use of electrolytes to cream or agglomerate latices have been proposed. Although the amount of electrolyte utilized in the process in itself may not affect the particle size of the latex, it enhances dramatically the action of the acid anhydride so as to permit larger particle sizes to be obtained and/or to permit reduction of the amount of anhydride and time required for agglomeration to equivalent particle size.

DESCRIPTION OF THE PREFERRED EMBODIMENTS

As will be readily appreciated, various factors affect optimum operation of the process and the several variables must be considered in determining the process conditions required for a given latex and/or a given particle size increase. The effect of such variables will be discussed at length hereinafter and illustrated in the examples.

The polymeric latex

The aqueous latices which may be used in the present invention are those of polymers with particles having surfaces sufficiently soft or tacky under the conditions of operation so that the particles will adhere to each other upon collision once the protection of the emulsifying agent is removed or impaired. Such polymers may be inherently soft and/or tacky such as rubbers or they may be rendered so by swelling with a solvent prior to the process of the present invention, such as styrene-acrylonitrile and styrene-methacrylate polymers. As used hereinafter, the term "soft polymers" shall apply to polymers having latex particles which inherently have soft and/or tacky surfaces and to polymers which have been treated with solvents to render the surface of the latex particles soft and/or tacky to provide the desired adherent characteristics.

Thus, the polymers with which the present invention may be employed are the rubbery polymers such as the diene rubbers, polyisoprene rubbers, acrylate rubbers, ethylene-propylene rubbers, and mixtures thereof, as well as non-rubbery polymers such as polystyrene, styrene-acrylonitrile polymers, and other polymers which are susceptible to attack by solvent to render the surfaces of the particles soft and/or tacky.

The preferred latices are those of diene rubbers or mixtures of diene rubbers, i.e., any rubbery polymers (a polymer having a second order transition temperature not higher than 0° centigrade, preferably not higher than −20° centigrade, as determined by ASTM Test D-746-52T) of one or more conjugated, 1,3-dienes, e.g., butadiene, isoprene, piperylene, chloroprene, etc. Such rubbers include homopolymers of conjugated 1,3-dienes with up to an equal amount by weight of one or more copolymerizable monoethylenically unsaturated monomers, such as monovinylidene aromatic hydrocarbons (e.g., styrene; an aralkyl-styrene, such as the o-, m- and p-methylstyrenes, 2,4-dimethyl-styrene, the ar-ethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.); arhalo monovinylidene aromatic hydrocarbons (e.g., the o-, m- and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butylacrylamide, etc.); unsaturteed ketones (e.g., vinyl methyl ketone, methyl isopropenyl ketone, etc.) alpha-olefins (e.g., ethylene, propylene, etc.); pyridines; vinyl esters( e.g., vinyl acetate, vinyl stearate, etc.); vinyl and vinylidene halides (e.g., the vinyl and vinylidene chlorides and vinylidene chlorides and bromides, etc.); and the like.

A preferred group of rubbers are those consisting essentially of 75.0 to 100.0 percent by weight of butadiene and/or isoprene and up to 25.0 percent by weight of a monomer selected from the group consisting of monovinylidene aromatic hydrocarbons (e.g., styrene), and unsaturated nitriles (e.g. acrylonitrile), or mixtures thereof. Particularly advantageous substrates are butadiene homopolymer or interpolymers of 90.0 to 95.0 percent by weight butadiene and 5.0 to 10.0 percent by weight of acrylonitrile or styrene.

As the content of a non-rubbery monomer in a rubber copolymer approaches 50 percent by weight of the interpolymer, there is a tendency to form coagulum so that the preferred rubber interpolymers will normally contain less than about 35.0 percent of a non-rubbery monomer, particularly when such a monomer is polar.

Although the rubbery polymer may contain minor amounts of a cross-linking agent, generally less than about 2.0 percent by weight, excessive cross-linking of the polymer should be avoided since it renders the surface of the particles relatively hard and the particles do not adhere to each other upon collision. Subsequent to agglomeration in accordance with the present invention, the particles may be highly cross-linked if so desired with possible benefits in agglomerated particle stability, although high cross-linking may be undesirable for some processes to which the rubber may later be subjected and wherein solution or optimum dispersion of the rubber is desired.

The solids content of the latices may vary from as little as about 5.0 percent by weight to as much as about 60.0 percent by weight; the preferred latices contain about 20.0 to 40.0 percent solids. The more dilute latices are not so conducive to formation of optimum particle size within reasonable time periods and the more concentrated latices sometimes tend to introduce a need for more critical process control. Generally, however, the particle size of the agglomerate increases with increasing solids content in the latex.

The latex must contain an emulsifying agent which is the salt of an organic acid with an ionization constant which is lower than that of the anhydride to be used in the process, such as, for example, the conventionally employed fatty acid soaps such as sodium oleate, sodium stearate, sodium palmitate, the equivalent potassium salts, and mixtures thereof such as rubber reserve soap. Generally, such fatty acid soaps may be characterized as the alkali metal salts of the $C_{12}$–$C_{22}$ aliphatic acids although ammonium salts may be useful in some limited applications. In addition, the latex may contain other emulsifying agents such as the anionics or non-ionics so long as these other emulsifying agents are not present in such a concentration as to render the latex stable to the acid anhydride. As will be appreciated, the amount of the emulsifying agent will normally vary with the concentration of the latex and the particular polymer involved; latices containing substantial excesses of emulsifying agent over that required for stability are not desirably employed.

The acid anhydride

Various organic anhydrides may be used in the present invention if they possess the requisite degree of water solubility, and a relatively low ionization constant for the acid components. To be effective, the acid anhydride must be sufficiently water soluble to hydrolyze and provide acid radicals for reaction with enough emulsifying agent to reduce the stability of the latex for collision of the particles and the resultant agglomeration. The ionization constant will be dependent upon that of the particular acid of the emulsifying agent, but generally the water-soluble acid anhydrides have significantly higher ionization constants than the conventionally employed alkali metal soaps.

Illustrative of the acid anhydrides are acetic acid anhydride, maleic acid anhydride, and propionic acid anhydride. Whether the acid is saturated or dicarboxylic appears to be of no significance.

In order to achieve the desired homogeneous admixture within the latex rapidly and prior to appreciable hydrolysis, it may be desirable to admix the anhydride initially with an organic solvent therefor which is readily miscible with water. For example, methanol, ethanol and acetone may be used advantageously to dissolve maleic acid anhydride and propionic acid anhydride and even the more highly soluble acetic acid anhydride, ratios of 1–3 parts solvent per part of anhydride being satisfactory. The resultant organic solution may then be admixed with a small volume of water which is then added to the latex. Alternatively, the more soluble anhydrides are desirably dissolved in a small volume of water which is then added to and admixed with the latex so as to obtain a homogeneous admixture rapidly. Heat may also be used to facilitate instant solution of the anhydride in a carrier for addition to the latex, but premature hydrolysis of the anhydride should be avoided.

The amount of anhydride required varies with the amount of salt and emulsifying agent present in the latex which is to be reacted therewith, and with the desired size of the agglomerated particles to be obtained. In addition, it has been noted that the acid anhydride tends to be more effective in latices of rubber interpolymers containing polar monomers since increasing the amount of polar monomer tends to decrease the amount of anhydride required for equivalent particle size increase.

Although amounts of anhydride eual to one-tenth the stoichiometric equivalent of the emulsifying agent (a molar ratio of 1:20 since there are two acid radicals) will produce some agglomeration in most instances, the amount employed is preferably at least one-fifth the stoichiometric equivalent. For optimum operation, the acid anhydride is added in an amount greater than one-half the stoichiometric equivalent of the emulsifying agent, and, oftentimes, somewhat in excess thereof. Amounts greatly in excess of the stoichiometric amount provide no significant additional benefit in terms of speed and may interfere with the stability of the agglomerated latex or with the properties of the polymer by introducing excessive acidity or corrosive action.

The inorganic electrolyte

Various water-soluble monovalent and polyvalent metal and ammonium salts may be used as the inorganic electrolyte including halides, sulfates, nitrates and phosphates depending upon the latex and the presence of radicals therein which might be adversely affected thereby. Exemplary of the materials which have been advantageously employed are magnesium sulfate, aluminum sulfate, sodium chloride, potassium chloride, sodium sulfate, ammonium chloride, ammonium sulfate, etc. From the standpoint of minimizing contamination the preferred electrolyte are the salts of the alkali metals and ammonia. The alkali metal and ammounium halides and sulfates have proven highly advantageous from the standpoint of control, cost, minimal adverse effect upon the latices and optimum cooperation with the acid anhydride.

The amount of the inorganic electrolyte will vary with the particular latex, the particular acid anhydride and the amount thereof, and the patricle size that is desired. Generally, beneficial effects are obtained with as little as 0.05 parts of the electrolyte per 100 parts of the polymer of the latex but preferably the amount of the electrolyte is at least 0.2 part per 100 parts of the latex polymer. The maximum amount of the electrolyte will vary with the particular acid anhydride and the particular electrolyte selected. With sodium chloride and one part of an acetic anhydride in a 38 percent solids polybutadiene latex, the maximum amount of electrolyte that can be added without causing coagulation is about 3.0 parts per 100 parts of the latex polymer. However, magnesium sulfate and aluminum sulfate may be used in larger amounts with some latices without producing coagulation of the latex.

The inorganic electrolyte may be added to the emulsion of the monomers before polymerization thereof to produce the latex polymer or it may be added to the polymerized latex. In the latter instance, care should be taken to introduce the electrolyte fairly slowly or in a dilute solution so as to avoid excessive concentration at any point within the latex and thus prevent coagulation. Efforts to add the electrolyte together with the acid anhydride have proven such a technique to be quite unreliable since coagulation occurs quite often.

The agglomerating reaction

As previously indicated, the acid anhydride must be homogeneously distributed throughout the latex to achieve proper results. However, the admixture of the anhydride and the latex must be effected prior to appreciable hydrolysis of the anhydride or under conditions of minimal agitation. If the anhydride has hydrolyzed and the latex-anhydride mixture is subjected to appreciable agitation, the polymer particles tend to coagulate rather than agglomerate under controllable conditions and the coagulum cannot be utilized.

Accordingly, the anhydride or any carrier solution thereof should be dispersed throughout the latex rapidly prior to appreciable dissociation of the anhydride. Thus, carrier solutions of the anhydride with water should not be allowed to stand for long periods or should be maintained under conditions which inhibit hydrolysis of the anhydride such as by storage under refrigeration. It may be desirable in some instances to admix the anhydride and the latex at chilled temperatures to minimize hydrolysis, but, generally, the relatively low rate of hydrolysis of the anhydrides will permit admixture by conventional agitation techniques.

The time required for the agglomeration of the latex particles to the desired size will be dependent upon a number of factors including the temperature, the relative amounts of anhydride, electrolyte and emulsifying agent, the rate of hydrolysis of the anhydride, the nature of the latex polymer, the nature of the electrolyte, the initial and desired sizes of the latex particles, etc. Generally, some agglomeration will occur shortly after appreciable hydrolysis of the anhydride has taken place if there is no great excess of the emulsifying agent. In practice, it has been found that beneficial results may be obtained in as little as 5 minutes and the reaction may proceed as long as 10 hours and even longer without any undesirable effect so long as the mixture is subjected to no appreciable agitation.

At temperatures of ambient to about 90° centigrade, time periods of 5 minutes to 2 hours will normally be satisfactory to obtain the desired particle size. At temperatures below ambient and down to about 0° centigrade, time periods are longer for comparable results, ranging from about 30 minutes to 10 hours. Conveniently, the agglomerating reaction is conducted at ambient temperatures over a period of about 20 minutes to about 2 hours although longer periods may be employed with no significant additional benefit.

The temperature at which the agglomerating reaction is conducted has not been found to exert any appreciable effect upon the size of the agglomerated particles although it does inffuence the time required for the reaction to take place and to produce the desired particle size as indicated above. Since the rate of hydrolysis of the anhydride tends to be reduced by a decrease in temperature and the Brownian movement of the particles also tends to be reduced, the time required for equivalent results is extended by decrease in temperature but the reaction can be performed satisfactorily at any temperature above the freezing point of the latex so long as the anhydride is sufficiently soluble at that temperature. For large volumes of latex, chilled temperatures may be desirable at least during initial admixture of the anhydride to prevent excessive premature hydrolysis of the anhydride while agitation is being employed. Thereafter, the temperature may be raised to ambient or above to facilitate hydrolysis and rapid agglomeration.

As previously stated, agitation after hydrolysis of the anhydride has taken place should be avoided. Although it has been found that some stirring at very slow rates and with very low power or shear input can be tolerated, difficulties in avoiding zones of higher agitation favor the complete elimination of agitation since it is not required for the reaction once the anhydride has been homogeneously distributed throughout the latex. However, where the reactor is jacketed and temperature controlled, some stirring may be desirable to obtain satisfactory heat transfer but it should be minimized and the maximum amount tolerable determined for the reactor with a given latex, electrolyte and anhydride. As used herein, the term "minimal agitation" refers to the absence of agitation or the use of relatively minimal agitation at a level below which coagulation will occur.

The particle size of the agglomerate can be varied by selecting the conditions of the agglomerating reaction such as time, temperature, electrolyte, anhydride and ratio of anhydride to emulsifying agent. In addition, the particle size will tend to increase with increase in the solids content of the latex. With the present invention, it is possible to obtain an increase in particle size from original latex particles in the range of 0.01–0.2 microns (number average). Agglomerated latex particles of 0.1–0.6 microns are readily obtained with various latices and particles of 0.8–1.0 micron and even larger have been obtained with some latices.

Stabilization of the agglomerated latex

After the agglomerating reaction has proceeded to the desired extent, the agglomerated latex must be stabilized before it is subjected to any great measure of agitation to avoid formation of coagulum. This may be effected by adding a separate, acid-stable emulsifying agent or by adding a basic alkali metal compound to react with the acid of the emulsifying agent originally present and thereby regenerate the alkali metal soap in sufficient amount to provide stability. In either instance, the agitation required to disperse the added material throughout the latex should be minimized, and the emulsifying agent or alkali metal compound is desirably added in aqueous solution to facilitate dispersion and minimize undesirable agitation. After dispersion of the stabilizer has been effected, the latex may be agitated as required for subsequent processing and other reactions such as grafting and the like.

The amount of the stabilizing emulsifying agent may vary from as little as about 0.03 to 15.0 parts per 100 parts of polymer, and even higher since there is no tendency for the agglomerated particles to redisperse. Generally amounts of about 0.07–3.00 parts per 100 parts polymer, and preferably 0.1–1.0 parts, are utilized.

Among the added emulsifying agents which may be employed are anionic emulsifying agents such as alkali metal salts of long chain sulfonic acids, and nonionic emulsifying agents such as ethoxylated octyl phenol. Normally the nonionic agents are required to be added in larger amounts than the anionics.

If the emulsifying agent is to be regenerated, an alkali metal hydroxide or other basic compound such as a carbonate is conveniently employed. The amount added is preferably at least the stoichiometric equivalent required to react with the anhydride added although somewhat smaller amounts may be used with some lessening in stability of the latex. Amounts of more than two times the stoichiometric equivalent may have an adverse effect upon some latices so that the preferred amounts are 0.9–1.5 times the stoichiometric equivalent of the anhydride (1.8–3.0 times the molar amount of anhydride).

Illustrative of the efficacy of the present invention are the following specific examples wherein all parts are parts by weight unless otherwise indicated.

EXAMPLE 1

Part A

A latex is prepared by polymerizing butadiene and acrylonitrile to obtain a copolymer containing 86 parts butadiene and 14 parts acrylonitrile. The latex contains 32.7 percent solids and has an emulsifying agent 1.6 parts of sodium oleate. The particle size of the polymer is observed to be about 0.08 microns (weight average).

Part B

To 100 parts of the latex is added a solution obtained by admixing for less than one minute 1.0 milliliter of acetic acid anhydride with 10.0 milliliters of water. The anhydride solution and latex are stirred for less than one minute to effect homogeneous distribution and thereafter the admixture is allowed to stand for three hours at ambient temperature without agitation.

To the agglomerized latex is added 10 milliliters of a 2.8 percent by weight aqueous solution of the sodium salt of a long chain sulfonic acid anionic emulsifying agent sold by Rohm & Haas Co. of Philadelphia, Pa. under the trademark Triton X–200. Admixture is effected by very slow stirring to avoid formation of a coagulum. The weight average particle size of the agglomerated and stabilized latex is determined to be about 0.3029 microns representing about a four-fold increase. The stabilized latex is found to be stable at various conditions of agitation.

Part C

A 10 percent by weight sodium chloride solution is prepared and is admixed with 100 parts of the latex in varying amounts so as to provide a number of specimens containing increasing amounts of sodium chloride. Thereafter acetic acid anhydride is added in the manner indicated in Part B. The admixture is allowed to stand for three hours at ambient temperature and is then stabilized as indicated in Part B. The weight average particle size is determined for the several specimens and is indicated in Table 1 below.

TABLE 1

| Parts sodium chloride per 100 parts latex: | Particle size microns (weight average) |
|---|---|
| .2 | .4739 |
| .3 | .6409 |
| .4 | .6609 |
| .6 | .7999 |
| .7 | .819** |
| .75 | 2.7769 |
| .8 | 2.5419 |
| .9 | (3) |
| 1.0 | (3) |
| 1.1[1] | (3) |
| 1.2[1] | (3) |

[1] Used only 0.5 parts acetic anhydride per 100 g. latex.
[2] Size of particles much larger than indicated. Values stated do not represent actual size because function double valued at large particle sizes in weight average measurements.
[3] Coagulated upon addition of anhydride.

EXAMPLE 2

The procedure of Part C of Example 1 is substantially repeated utilizing as the latex a butadiene/styrene (90/10) copolymer containing 40 percent solids. To the latex prior to the polymerization of the monomers is added sodium chloride in an amount of 0.667 parts per 100 parts of monomers. After polymerization, one milliliter of acetic acid anhydride in 10 milliliters of water is gently admixed with the latex, and solution is allowed to stand at ambient temperature for three hours. Thereafter the solution is stabilized as indicated in Part B of Example 1. The weight average particle size of the resultant latex is found to be 0.8709 micron.

EXAMPLE 3

The procedure of Example 2 is repeated utilizing as the latex a butadiene/acrylonitrile copolymer (90/10) and only 0.3 milliliter of acetic acid anhydride. The weight average particle size of the resultant agglomerated latex is found to be 0.445 micron. Tests using larger amounts of acetic acid anhydride tend to produce coagulation of the latex.

EXAMPLE 4

The procedure of Part C of Example 1 is repeated utilizing the electrolyte ammonium chloride, ammonium sulfate, aluminum sulfate and magnesium sulfate. In all instances significant increase in particle size is obtained in conjunction with the acetic acid anhydride. In addition, it is found that greater amounts of magnesium sulfate and aluminum sulfate may be utilized as compared to sodium chloride with this particular latex without producing coagulation. However, some tendency for coagulation tends to occur at the instant of addition but the incipient coagulum is dispersible.

Thus, it can be seen that the present invention provides a novel and highly effective method for increasing the particle size of various soft or solvent-softenable polymers. The electrolyte enhances the action of the acid anhydride and enables the production of larger particles and/or the use of lesser amounts of the more costly anhydrides. Cycle times for comparable agglomerates may also be reduced. The resultant agglomerated particles are stable under normal conditions of handling and processing and may be subjected to additional procedures such as graft polymerization and the like. By reason of the simplicity of the operation, the present technique may be adapted readily to existing equipment and may be tailored to generate latex particles of relatively large size which may be controlled within tolerable distribution levels.

It is obvious that many variations can be made in the processes set forth without departing from the spirit and scope of this invention.

What is claimed is:

1. In a process for increasing the size of particles of a polymer in an aqueous latex, the steps comprising: admixing a water-soluble, inorganic acid anhydride with an aqueous latex of a soft polymer containing a water-soluble inorganic electrolyte, said electrolyte being a salt of a cation selected from the group consisting of alkali metals, alkaline earth metals, ammonia, and mixtures thereof, said polymer being formed from at least one ethylenically unsaturated monomer and the particles of said polymer being adherent upon collision and said latex containing an emulsifying agent a soap which is the salt of an organic fatty acid with an ionization constant lower than that of the acid of the anhydride; allowing the admixture to stand with minimal agitation for a period sufficient to hydrolyze the acid anhydride and produce agglomeration of the particles of the polymer; and stabilizing the latex of the agglomerated polymer particles with emulsifying agent prior to subjecting the agglomerated latex to substantial agitation of an intensity which would effect coagulation thereof, said emulsifying agent being provided by means selected from the group consisting of adding an acid-stable emulsifying agent, regeneration of said soap by addition of a basic compound, and the combination thereof.

2. The process of claim 1 wherein said inorganic electrolyte is an alkali metal halide.

3. The process of claim 1 wherein said polymer is a diene rubber polymer selected from the group of homopolymers and interpolymers of conjugated 1,3 dienes having a second order transition temperature not higher than 0° centigrade.

4. The process of claim 1 wherein said acid anhydride is selected from the group consisting of acetic acid anhydride and maleic acid anhydride, and mixtures thereof.

5. The process of claim 1 wherein said inorganic electrolyte is present in an amount of about 0.05 to not more than about 12 parts per 100 parts of polymer in said latex.

6. The process of claim 1 wherein said second-mentioned emulsifying agent is regenerated from the acidified first-mentioned emulsifying agent by adding to said latex a basic alkali metal compound.

7. The process of claim 1 wherein said second-mentioned emulsifying agent is an acid-stable compound.

8. The process of claim 1 wherein said acid anhydride is initially dissolved in water of a volume less than that of said latex and said solution is added to said latex.

9. The process of claim 8 wherein a water-miscible organic solvent for said acid anhydride is admixed therewith in a ratio of about 1–3 parts solvent per part anhydride to facilitate solution in the water.

10. The process of claim 1 wherein said acid anhydride is admixed in a molar amount at least equal to one-half the molar amount of said first-mentioned emulsifying agent.

11. The process of claim 10 wherein said electrolyte is present in said latex in an amount of 0.2–12.0 part per 100 parts of polymer in said latex.

References Cited

UNITED STATES PATENTS 2,467,054   4/1949   Rumbold _____ 260—23.7

DONALD E. CZAJA, Primary Examiner

D. J. BARRACK, Assistant Examiner

U.S. Cl. X.R.

260—23, 23.5, 29.6, 29.7, 32.8, 33.4

PO-1050
(5/69)

UNITED STATES PATENT OFFICE
CERTIFICATE OF CORRECTION

Patent No. 3,551,370        Dated   December 29, 1970

Inventor(s) William O. Dalton

It is certified that error appears in the above-identified patent and that said Letters Patent are hereby corrected as shown below:

Column 1, lines 2 and 3, "anhydried" should read --- anhydride ---.

Column 3, line 55, "rubber" should read --- rubbery ---.

Column 9, Claim 1, line 3 "inorganic" should read --- organic ---.

Column 9, Claim 1, line 15, after "containing" insert --- as ---.

Signed and sealed this 15th day of June 1971.

(SEAL)
Attest:

EDWARD M. FLETCHER, JR.
Attesting Officer

WILLIAM E. SCHUYLER, JR.
Commissioner of Patents